US009531795B2

(12) United States Patent
Kluin et al.

(10) Patent No.: US 9,531,795 B2
(45) Date of Patent: *Dec. 27, 2016

(54) SYSTEM AND METHOD FOR PERFORMING DISTRIBUTED ASYNCHRONOUS CALCULATIONS IN A NETWORKED ENVIRONMENT

(71) Applicant: WORKIVA INC., Ames, IA (US)

(72) Inventors: Robert A. Kluin, Ames, IA (US); Beau D. Lyddon, Ames, IA (US)

(73) Assignee: Workiva Inc., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/694,417

(22) Filed: Apr. 23, 2015

(65) Prior Publication Data
US 2015/0229721 A1    Aug. 13, 2015

Related U.S. Application Data

(63) Continuation of application No. 14/505,482, filed on Oct. 2, 2014, which is a continuation of application No. 13/780,725, filed on Feb. 28, 2013, now Pat. No. 8,856,234.

(51) Int. Cl.
| | |
|---|---|
| *G06F 15/16* | (2006.01) |
| *H04L 29/08* | (2006.01) |
| *H04L 29/06* | (2006.01) |
| *G06F 17/24* | (2006.01) |
| *G06F 9/54* | (2006.01) |
| *G06F 17/30* | (2006.01) |

(52) U.S. Cl.
CPC ............... *H04L 67/10* (2013.01); *G06F 9/546* (2013.01); *G06F 17/246* (2013.01); *G06F 17/30507* (2013.01); *G06F 17/30958* (2013.01); *H04L 67/1095* (2013.01); *H04L 67/42* (2013.01); *G06F 17/30356* (2013.01); *G06F 17/30365* (2013.01); *G06F 17/30563* (2013.01); *G06F 17/30604* (2013.01); *G06F 17/30952* (2013.01)

(58) Field of Classification Search
CPC .............. G06F 17/246; G06F 17/30356; G06F 17/30365
See application file for complete search history.

(56) References Cited

U.S. PATENT DOCUMENTS

| | | | |
|---|---|---|---|
| 5,319,777 A | * | 6/1994 | Perez .................... G06F 17/246 |
| 5,761,815 A | | 6/1998 | Lin |
| 5,835,683 A | | 11/1998 | Corella et al. |

(Continued)

*Primary Examiner* — Ario Etienne
*Assistant Examiner* — Blake Rubin
(74) *Attorney, Agent, or Firm* — Drinker Biddle & Reath LLP

(57) ABSTRACT

A method and associated system are provided for performing calculations in a distributed networked environment, comprising: updating a source element on a first computer; sending a calculate update signal to a target calculated element for updating on a target element computer that may be the first computer or a second computer connected to the first computer that uses the source element in a calculation; obtaining the updated source element by a process on the target element computer associated with the target calculated element in response to the sending; and performing a calculation to update the target calculated element using the obtained updated source element.

7 Claims, 4 Drawing Sheets

(56) References Cited

U.S. PATENT DOCUMENTS

| | | | | |
|---|---|---|---|---|
| 6,138,130 | A * | 10/2000 | Adler | G06F 17/246 715/209 |
| 6,327,592 | B1 * | 12/2001 | Yoshikawa | G06F 17/246 |
| 6,341,292 | B1 * | 1/2002 | Cho | G06F 17/246 |
| 6,411,967 | B1 * | 6/2002 | Van Renesse | G06F 17/30575 707/625 |
| 6,446,055 | B1 * | 9/2002 | Grand | G06F 9/465 706/10 |
| 6,613,098 | B1 | 9/2003 | Sorge et al. | |
| 6,701,485 | B1 * | 3/2004 | Igra | G06F 17/246 715/209 |
| 6,912,690 | B2 | 6/2005 | Bauchot | |
| 6,988,241 | B1 * | 1/2006 | Guttman | G06F 17/246 707/E17.115 |
| 7,249,328 | B1 | 7/2007 | Davis | |
| 7,321,864 | B1 | 1/2008 | Gendler | |
| 7,421,648 | B1 * | 9/2008 | Davis | G06F 17/30882 707/E17.013 |
| 7,533,139 | B2 | 5/2009 | Jones et al. | |
| 7,546,521 | B2 | 6/2009 | Bedford et al. | |
| 7,685,013 | B2 | 3/2010 | Gendler | |
| 7,792,847 | B2 | 9/2010 | Dickerman et al. | |
| 8,121,911 | B2 | 2/2012 | Whitehead, Jr. et al. | |
| 8,181,150 | B2 | 5/2012 | Szpak et al. | |
| 8,527,865 | B2 * | 9/2013 | Li | G06F 17/246 707/694 |
| 8,626,477 | B2 | 1/2014 | Oh | |
| 9,389,891 | B2 * | 7/2016 | Battagin | G06F 17/30896 |
| 2002/0010743 | A1 | 1/2002 | Ryan et al. | |
| 2002/0091730 | A1 | 7/2002 | Bedford et al. | |
| 2005/0015379 | A1 * | 1/2005 | Aureglia | G06F 17/246 |
| 2005/0149482 | A1 | 7/2005 | Dillon | |
| 2005/0182709 | A1 * | 8/2005 | Belcsak | G06Q 20/10 705/38 |
| 2005/0188352 | A1 * | 8/2005 | Jager | G06F 8/30 717/106 |
| 2006/0048044 | A1 * | 3/2006 | Genesereth | G06F 17/246 715/213 |
| 2006/0095832 | A1 | 5/2006 | Serra et al. | |
| 2006/0112123 | A1 * | 5/2006 | Clark | G06F 17/246 |
| 2006/0224946 | A1 * | 10/2006 | Barrett | G06F 17/246 715/210 |
| 2007/0028159 | A1 * | 2/2007 | Ying | G06F 17/246 715/201 |
| 2007/0061698 | A1 | 3/2007 | Megiddo et al. | |
| 2007/0088691 | A1 * | 4/2007 | Dickerman | G06F 17/246 |
| 2007/0233811 | A1 * | 10/2007 | Rochelle | G06F 17/246 709/219 |
| 2007/0260614 | A1 * | 11/2007 | Bray | G06F 17/30365 |
| 2008/0028288 | A1 * | 1/2008 | Vayssiere | G06F 17/246 715/219 |
| 2008/0046804 | A1 * | 2/2008 | Rui | G06F 17/246 715/212 |
| 2008/0162532 | A1 | 7/2008 | Daga | |
| 2008/0195506 | A1 | 8/2008 | Koretz et al. | |
| 2008/0244091 | A1 | 10/2008 | Moore et al. | |
| 2008/0244377 | A1 | 10/2008 | Erwig et al. | |
| 2009/0112937 | A1 | 4/2009 | Campbell et al. | |
| 2009/0158139 | A1 * | 6/2009 | Morris | G06F 17/246 715/234 |
| 2009/0259518 | A1 | 10/2009 | Harvey et al. | |
| 2010/0107048 | A1 | 4/2010 | Takahara | |
| 2010/0269092 | A1 | 10/2010 | Dorman | |
| 2011/0016379 | A1 | 1/2011 | McColl et al. | |
| 2011/0055682 | A1 | 3/2011 | Friedrich et al. | |
| 2011/0283177 | A1 | 11/2011 | Gates et al. | |
| 2011/0302194 | A1 | 12/2011 | Gonzalez et al. | |
| 2012/0144284 | A1 | 6/2012 | Le Brazidec et al. | |
| 2012/0166390 | A1 | 6/2012 | Merriman et al. | |
| 2012/0173476 | A1 | 7/2012 | Rizvi | |
| 2012/0192052 | A1 * | 7/2012 | Caplan | G06F 17/246 715/219 |
| 2012/0330995 | A1 * | 12/2012 | Muenkel | G06F 17/30424 707/769 |
| 2013/0036346 | A1 * | 2/2013 | Cicerone | G06F 17/276 715/217 |
| 2013/0086064 | A1 | 4/2013 | Salch et al. | |
| 2014/0149837 | A1 * | 5/2014 | Bedard | G06F 17/246 715/212 |
| 2014/0157098 | A1 * | 6/2014 | Maresca | G06Q 10/101 715/219 |
| 2014/0173400 | A1 * | 6/2014 | Mingot | G06F 17/30861 715/212 |
| 2015/0199328 | A1 * | 7/2015 | Danziger | G06Q 10/101 715/219 |

* cited by examiner

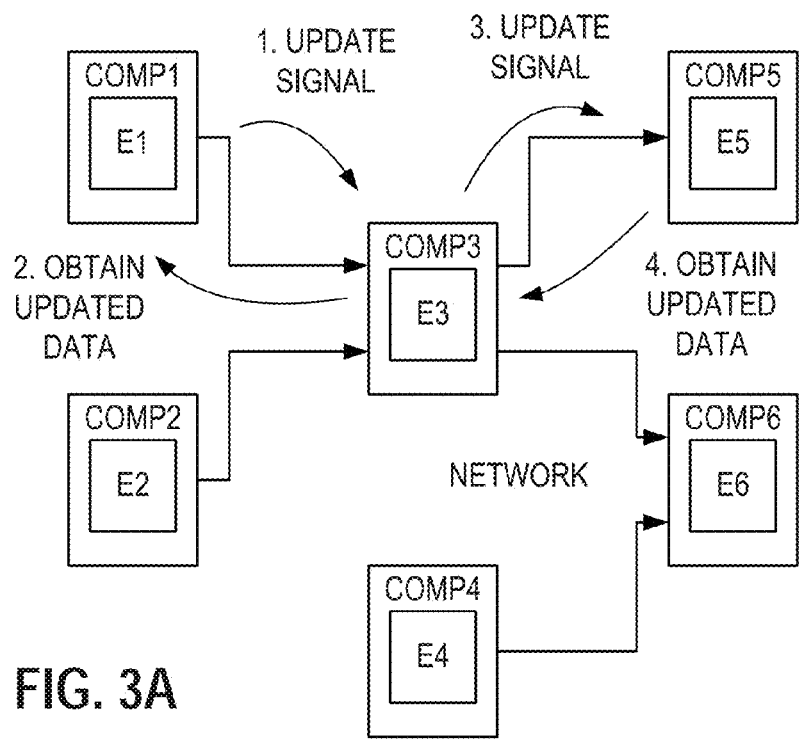

SYSTEM AND METHOD FOR PERFORMING DISTRIBUTED ASYNCHRONOUS CALCULATIONS IN A NETWORKED ENVIRONMENT

CROSS-REFERENCE TO RELATED APPLICATIONS

This application is a continuation application of parent application Ser. No. 14/505,482, filed Oct. 2, 2014, which is a continuation application of parent application Ser. No. 13/780,725, filed Feb. 28, 2013, now U.S. Pat. No. 8,856,234. The parent applications are herein incorporated by reference.

BACKGROUND

Described below is a system and related method for performing distributed asynchronous calculations in a networked environment.

A spreadsheet is a basic calculation tool in which users can define different constants in particular cells, and define formulas in different cells that reference other cells' values, and then update the calculated formula values when the cells change. In the simplest form, these cells are arranged in an array in a spreadsheet. A formula can take both constants and other calculated values as inputs so that a change in one constant can produce a number of changes in calculated formula values in any cell that relies on that constant either directly or indirectly.

Spreadsheets can be grouped together in larger entities (Microsoft Excel calls these larger entities Workbooks). Furthermore, such entities can be accessed by multiple simultaneous entities. However, such flexibility can create significant problems—including ensuring that one person's edits do not overwrite those of another. Furthermore, as the number of constant and calculated values becomes large (on the order of thousands or more), the sources may span across many networked computer systems that can span great geographical distances (and hence may be subject to communication delays, outages, etc.), the number of links in a calculation chain becomes large, and certain timing and logistical issues become more and more difficult.

SUMMARY

Disclosed herein is a system and method that efficiently, robustly, and flexibly permits large scale distributed asynchronous calculations in a networked environment, where the number of users entering data is large, the number of variables and equations are large and can comprise long and/or wide dependency chains, and data integrity is important. The network would typically be a wide area network (WAN) that may introduce some delay in communications between computers, although the network is not limited to this specific type of network, and could be a local area network (LAN) or some form of a bus architecture.

An area where the invention is particularly useful is in the preparation and filing of Securities and Exchange Commission (SEC) documents. Certain filings can require the input of hundreds or thousands of variables and include the input of hundreds of individuals. Historically, such input would be curtailed days in advance of a particular filing to ensure that the carry-forward calculations had consistent data and adequate time for entry. However, with the system and method disclosed herein such updates can be made with a significantly smaller delay in producing a final output with greater assurances of integrity.

Although this system and method are well suited for the above-mentioned application, their application is not limited thereto, and can be easily adapted and applied in any form of a distributed environment.

A method and associated system are provided for performing calculations in a distributed networked environment, comprising: updating a source element on a first computer; sending a calculate update signal to a target calculated element for updating on a target element computer that may be either the first computer or a second computer connected to the first computer that uses the source element in a calculation; obtaining the updated source element by a process on the second computer system associated with the target calculated element in response to the sending; and performing a calculation to update the target calculated element using the obtained updated source element.

DESCRIPTION OF THE DRAWINGS

Various embodiments are illustrated in the following drawings, in which:

FIG. 1 is a block diagram illustrating an exemplary element used in the system;

FIG. 2 is a block diagram illustrating three exemplary elements used in the system;

DETAILED DESCRIPTION

Figure 3B:
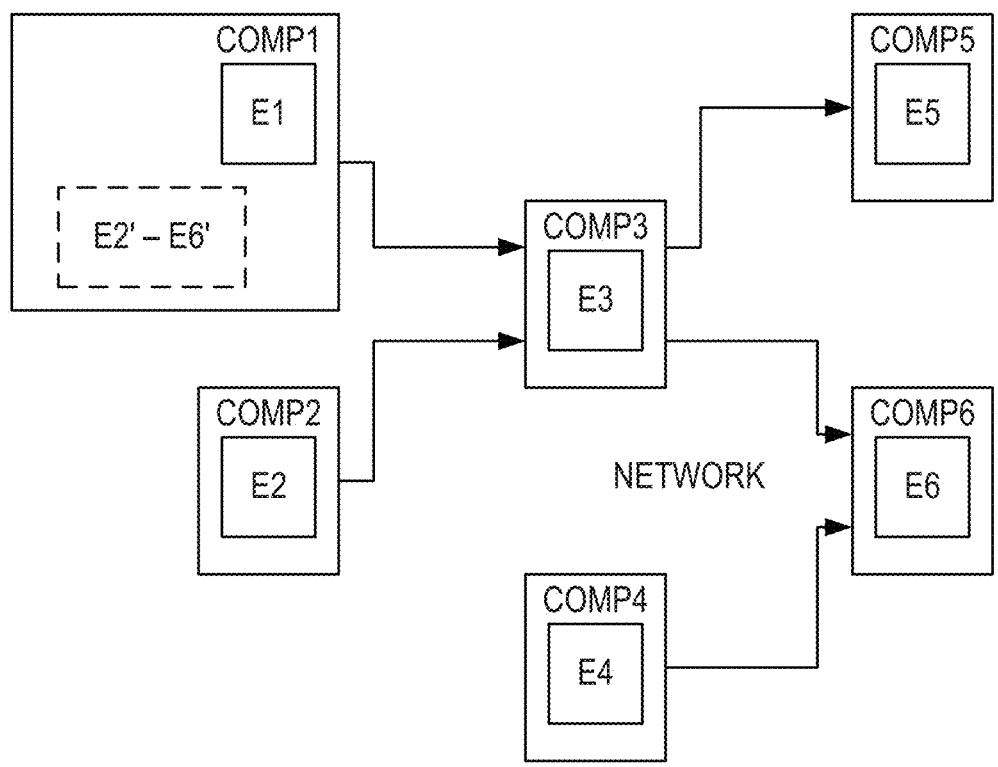
FIGS. 3A, B are block diagrams illustrating a number of elements, each on separate computers that are interconnected via a network with one another, and an update scheme.

At the core of various embodiments of the invention are the elements involved in calculations and the calculations using those elements as well.

FIG. 1 is an exemplary block diagram illustration of an exemplary constant element E1. As FIG. 1 illustrates there may be at least three parameters associated with the element E1: a global revision number G, a local revision number R, and a value V. The global revision number G may be used to support reconstructing states of a calculation graph (where a graph refers to a set of constants, equations, and the relationships between them at a point in time) at any state in time. The global revision number G tracks the number of revisions (changes in value, structure, and meta data) made to one or more graphs associated in some way, for example, all graphs belonging to a particular set of users, or a "company." This allows, for example, the entire state of a graph to be reconstructed based on any particular revision of a given element. The local revision number R is local to each element, and tracks the revisions made to that element, it gets incremented any time an element is modified or persisted. Additional parameters could also be associated with the element or each of the respective revisions, such as a creation and/or modified time stamp, the entity responsible for entering the value, the source location of the element, the list of other elements referenced by this element, the list of elements this elements references.

The element E1 shown is a constant, which may be entered by a user in a form, table, or fielded document, e.g., displayed on a computer screen or originate from some other data source. However, this element could also be a variable that is the result of an equation or calculation designed to take other inputs that are either constants or the results of other equations or calculations. If an element represents an equation, the equation is stored in/with the element as well. This means the relationships can be fully defined using only the elements themselves.

As can be seen in FIG. 1, the element E1 has three revisions associated with it, with each revision having a changed value. As can be seen in FIGS. 1 and 2, the global revision numbers G do not necessarily correspond 1:1 with the local revision numbers R, and that for different constants (E1, E2), a global number revision number can reflect a different local revision number. Each time one of the constants E1 or E2 changes, a new local version number for E3 may be created, but this is not always the case. There may be deeper formulas that dictate whether such updates get new version numbers (and get propagated)—particularly for formula elements whose values do not change.

By way of a simple example, if element E1 increases by one while element E2 decreases by one, then, for a simple addition by element E3, there is no value change to E3, and hence the revision does not have to increment (and no further value change needs to propagate), even though the underlying values do. Constants and calculated values may herein be referred to as "elements", and bear some similarities with cells in a spreadsheet, although the data associated with the elements herein can be much richer and permit significantly enhanced capabilities.

The local revision numbers are element specific and are incremented any time a value stored on, or associated with, the element changes. Global revision numbers may be incremented when saving a group, or batch, of changes together as an atomic group. This allows a complete view of one or more graphs to be retrieved. Utilizing two distinct revision numbers also allows for multiple "working copies" of a given element to exist. For example, if "user" or "process" generated changes only increment local revisions numbers, and the global revision number is only incremented when applying the users changes to the global, "shared", version of the elements, then it is possible to know and separate other users' changes from system changes. Using two revision numbers is also useful for reconstructing a graph at a point in time. It allows multiple versions of the same graph to be calculated at once.

The association of a revision history with a particular element provides many benefits, including the ability to return to any particular state of the system at any time, or to generate a report that is a snapshot at any particular point in time. In order to produce a system state based on a particular revision of an element, only revisions of elements with a global revision number less than or equal to that element's global revision at the desired revision are used in the calculation.

The system does not require any historical versions of the elements to be stored—only the latest version is needed. In many cases it is desirable to leave all historic versions of the elements for audit purposes, such as is the case for SEC reporting. However, when storage space is constrained or system resources limited, there are compression and cleanup mechanisms which may be implemented to offer historic reporting or audit capabilities. One common cleanup mechanism is to store only the global revisions and the latest local revision of each element. This has the advantage of not losing information or major states of the system. Global revisions may also be compacted either on demand or periodically. In the global compaction process some interim global revisions are deemed unneeded and removed, leaving only the desired global revisions. Depending on the use-case's requirements, global revisions stored on historical versions of elements may require updating to ensure historic reports will always appear consistent.

FIG. 2 illustrates a simple three-element configuration in which two of the elements E1, E2 are constants, and one element E3 is a calculation that is based on the two constants (E3=E1+E2). As can be seen, each of the versions found in elements E1 and E2 may also be tracked in the calculated value E3. For example, when a current local third version of element E1 ($E1_{R3}$) is changed from a value of three ($E1_{V(R3)}$=3) to seven, a new local version four ($E1_{R4}$) is created. But since this also will trigger a change in E3, a new local version of E3 must be created. The local version is updated each time the element changes.

Some mechanism is provided to notify an element that it must be recalculated. In one embodiment, calculated values may include an update flag UF, which, when set, indicates to the element that the flag belongs to that the element should perform a recalculation. As an alternative to the update flag (UF), or possibly in addition to it, when elements E1 or E2 are changed, element E3 may be sent a signal (e.g., in the form of a message) indicating it should recalculate its value. This is described in more detail below, although, as used in the claims, a "signal" could be construed generically as including both a sending of a message, setting an update flag, or any other form of communication within a computer system or computer network. This signal may be referred to herein as a "calculate" signal or an "update" signal.

FIGS. 3A and 3B are block diagrams illustrating a simplistic networked group of interdependent elements, where constant elements E1, E2, and E4, are used as inputs into formulas on calculation/equation elements E3, E5, and E6. As noted above, in an actual system, there may be thousands of different elements in a system. The low-level system does not inherently restrict the arrangement of elements in the system, it requires only that relationships are directed. Here, "directed" means that any given element knows which other elements to notify when its value changes. Note that graphs are not required to be acyclic (non-circular, meaning an element's value may influence its own value) as long as the implementer desires an infinite loop or an element's value converges to some point indicating the calculation process should be stopped. However, in practice, some restrictions are often enforced; requiring acyclic relationships is a very common restriction.

There are several mechanisms to prevent infinite loops. If cyclic graphs are allowed, then a convergence criteria may be defined. In that case, the previous and new value are compared. If they are less than some defined amount, the value is considered unchanged, and the list of elements using that element will not be sent the "recalculate" signal. Often, it is also (or alternatively) useful to include a max iteration limit, so that the value of any given element will only be recalculated some maximum number of times. If the limit is hit, recalculate messages are not propagated any further. If cyclic graphs are not allowed, then a list of elements already visited (referred to as "causers") may be passed along with the calculate signals. If an element finds itself in the causers list, it would then set its value to a special marker indicating a circular relationship and propagate the calc message. In this way, the entire segment of the graph with the circular relationship can be flagged as being in an error state. The causer list commonly takes the form of a list of element ids, or a special index (a bitmap), that may be checked. The choice is implementation dependent, depending only on the specific requirements.

In FIG. 3A, each of the elements may reside on a separate computer in a network, and the computers are interconnected via a network. How the elements access and address one another is not relevant herein, other than to say that each element can be uniquely addressed so that its parameters and values can be reachable in the networked environment. Since the computers can be located at large geographical distances from each other, it is possible that delays exist in the transmission of the elements or "signals" from one system to another.

Figure 4B:
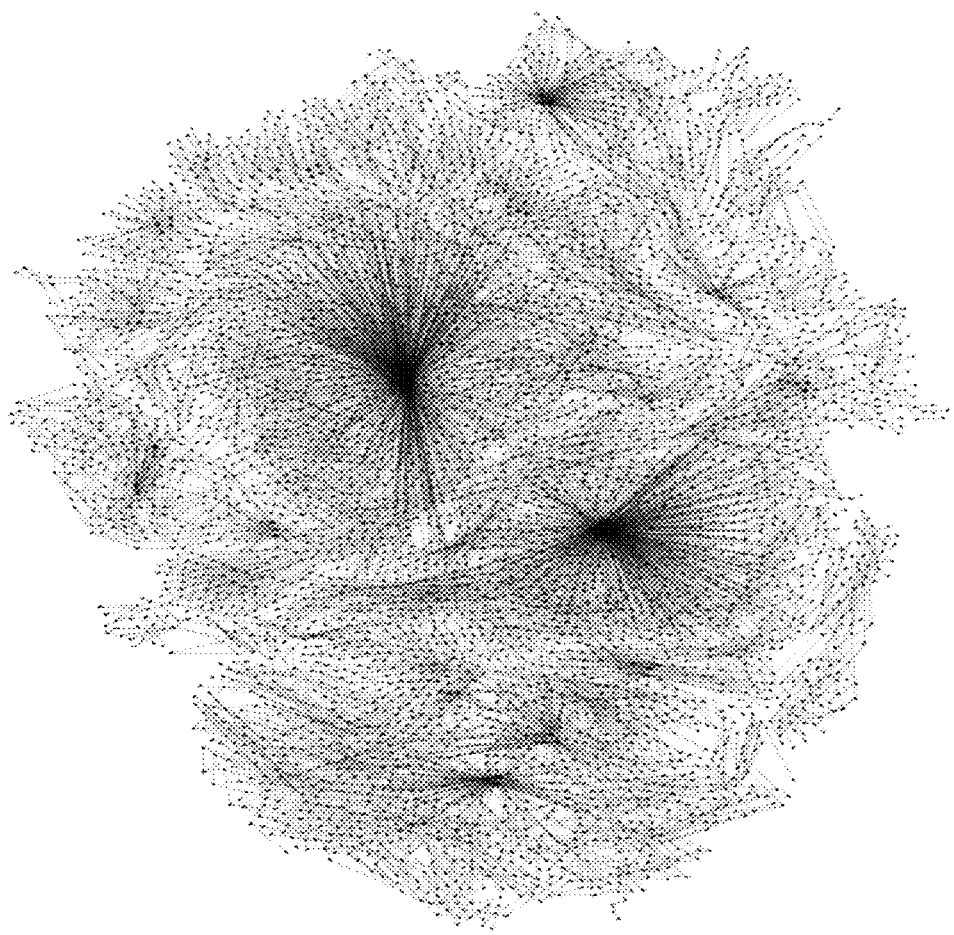
FIGS. 4A, B are pictorial diagrams representing numerous elements and interconnections/relationships that might be present in a given system.
Figure 4A:
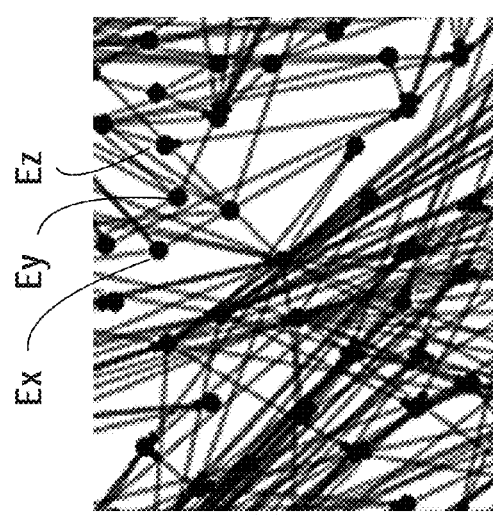

As can be seen in FIG. 3A, an update to element E1 and/or E2 triggers an update in calculated elements E3 and also E5 and E6. It is a hierarchical process in which an update to one number can affect many other numbers in a cascading effect. It is possible, in certain circumstances like the SEC example described above, for a one number update to affect many thousands of others—forming a massive ripple that goes through the system. FIG. 4A is a pictorial diagram of a small portion of an exemplary real-world graph, illustrating a number of elements, including Ex, Ey, and Ez, and respective interconnections to other elements. FIG. 4B is a global view of the elements and interconnections that may exist in a typical graph. There may be many thousands (there are over 5,000 elements in FIG. 4B) of elements with an even greater number of interconnects/relationships. As can be seen in FIG. 4B, some of the elements (those nearer the outer edge) have few direct interconnections with other elements, whereas some of the more centrally located elements have many direct interconnections.

However, in contrast to precomputing and using the resultant partial ordering of the graph to determine the order of updating, and then performing every calculation in one pass, as might be performed in a typical spreadsheet, the system and method herein utilize a different approach. In the spreadsheet context, everything must be loaded into the calculating system and operated on all at once or loaded and evaluated sequentially. Both of those approaches are more resource intensive with large graphs. Such an operation in such a large and distributed environment could cause the calculating system to hang, as it performs the many calculations serially or possibly in parallel where the graph permits.

Furthermore, the introduction of many chained networked documents would make such an approach undesirable, as the delays could exponentially increase. And in a cloud/collaborative environment, many people and many sources can be changing elements at the same time—having two separate sources changing elements that feed into a common formula creates a huge synchronization problem, in order to ensure the final number that comes out is correct. Two individuals can get two different numbers from a formula if not synchronized properly, i.e., updater A may have gotten a number based on a number that updater B committed, but updater B did not get updater A's number.

The easiest solution is to lock the graph (i.e., the elements involved in the calculation), although this exacerbates the delays that may be observed in the system, since one calculation must complete before another may begin. The system and method herein store the elements as separate items in a distributed database, and when a change is made (e.g., to element E1) that impacts other calculations (e.g., element E3), the element E1 sends a message to the impacted element E3 "update yourself".

This message could be presented in any form, and one exemplary way would be to set the update flag UF associated with the element that is set whenever one of that elements inputs changes. The update message may also be passed through a message queuing system. When the update message is read, a reading process may perform the relevant calculation or dispatch another process to perform the calculation. The element E1 may know that it impacts element E3 by a stored list of elements identifying other elements that use element E1 in calculations, or because element E3 stores a queriable list of elements required to calculate its value.

The list of elements using a particular element or used by a particular element may include additional metadata, such as version information about the related elements. This metadata can be used to optimize the calculations, reducing possibly unnecessary duplicate calculations, as described in more detail below.

In FIG. 3A, once the element E3 receives an indication that it needs to be updated (update signal), it may acquire all of its inputs from sources (obtain updated data) (and element E3 knows that elements E1 and E2 are its sources based on its list of elements required or the value of its formula) and then performs the calculation. When element E3 has finished its calculation, it knows that it needs to send a message or flag (update signal) to elements E5 and E6 to update themselves, since a change in element E3 will impact elements E5 and E6. Elements E5 and E6 then respectively obtain the updated data from element E3. Element E6 also fetches the latest value of element E4 to ensure it has the latest value, and to potentially reduce later calculations if element E4 was also recently changed. In addition, when element E3 saves its new state, it updates its local revision number, R. All updates to elements may be performed transactionally, and in the event of a collision, the calculation step for that element that hit the contention error is repeated to ensure consistency. An exemplary table showing the "used" inputs and "using" outputs for each element is provided below.

TABLE 1

Example Element Inputs and Outputs

| Element | Used Input (Source Elements for Element) | Using Output (Target Elements for Element) |
| --- | --- | --- |
| E1 | | E3 |
| E2 | | E3 |
| E3 | E1, E2 | E5, E6 |
| E4 | | E6 |
| E5 | E3 | |
| E6 | E3, E4 | |

The use of an update flag UF has an advantage in that it may save unnecessary calculations. For example, if both elements E1 and E2 change, the update flag for element E3 is set only once, and element E3 can be fully updated by acquiring currently updated values for elements E1 and E2 and performing the calculation a single time.

Alternately, or additionally, the update indications, signals, or messages that are sent to the elements upon change can be batched together, and a smart batch manager for a given system can eliminate unnecessary update requests. For example, in the embodiment shown in FIG. 3B, the message queue might contain an update message for element E6 from both element E3 and E4. The queue reader or handler could determine that the update calculation only needs to be performed once, even though there are two separate update requests in the queue. When the number of update requests for a given element are large, considerable effort can be saved by performing the calculation a single time and discarding the remaining queued update requests.

The messaging system also has the advantage that it does not require the message's target element to be loaded from the persistence layer into memory, and also reduces the possibility of producing contention on the target element from multiple sources trying to update an update flag UF. In this way, greater overall efficiency can be provided to the update calculations at the possible expense of some local inefficiency in certain pathological cases (where elements have a huge number of used and using elements).

Many of these pathological poor performance cases can be easily optimized for, however. For example, the case where the dependencies form a "chain" (a graph with maximum width one, or, where each element's value depends on at most one element, and its value impacts at most one other element), some efficiency can be gained by serially calculating the values in one process rather than passing messages between multiple computers. Elements that are impacted by many other elements can be optimized to "batch" their update messages to reduce the number of unneeded calculations done. Messages targeting elements that are in similar locations, either physical or logical, may also be batched and addressed to specific computers or clusters of computers to improve efficiency.

The updating itself can be handled by a background process of the computer which has access to the element to be updated or where the element is located. Advantageously, this can distribute the computation of variables across multiple systems, and, as the networked system as a whole grows, the available computers to perform the calculations may be easily increased as well. Given this allocation of processing power, however, it is not problematic if a variable calculates itself twice, based on two variable input changes occurring around, or at, the same time. The batching mechanism helps reduce, but does not fully eliminate, the inefficiency induced by a particular element being calculated multiple times. Some of the inefficiencies from over calculation are reduced, however, because values of inputs are not "passed in", but rather the most up to date values of inputs are fetched immediately before calculating, and propagation of calculate messages is stopped if the value does not change. In many cases, the inefficiencies are reduced to near optimal levels. This reduction occurs because in many cases on the first calculation the new value of both inputs will be fetched, and hence the next calculation will find an unchanged value and exit without propagating the calculate message (note the first change will propagate the message).

In the way described above, the changes in the system can propagate, and users can be sure that everything is eventually up-to-date. Advantageously, the system is auto-/self-correcting. An editor may be notified that input or output elements have been updated, and thus anything relying on these elements needs to reload. Note, however, that it is not required that editors be notified of such changes for the system of elements to remain in a correct state. When an editor saves their changes, their changes will be "mixed" with the most up-to-date values, producing a correct graph state. Each element needs to know its relationship to the other elements, as described above, and such relationships may be kept in an adjacency list or by constructing the elements as a linked list. If each element locally stores its adjacency list of what is dependent upon it and what it affects—it is able to send signals that, after processing, facilitate answering questions such as completeness and enhanced error recovery.

The data structure built by outputting and processing status signals from the calculation process can be used to determine the status of a graph by storing: 1) a representation of the graph as an adjacency list split into two sub-lists (described in more detail below); 2) metadata about the number of elements in each element's adjacency list; and 3) the largest known revision of each element. After each re-evaluation, a message may be output which contains the following information: a) an identifier of the element that was re-evaluated, b) the current global and local revision numbers of the element, c) a list of elements that use this element in a calculation, and d) a list of elements used in the evaluation and their respective version numbers.

One further advantage is that, because of local caching of elements, once an element has been computed, it can have fast access and can compute the value a second time much faster. This is also a very scalable process, and a user can accelerate the calculation speed in a scalable manner, the calculation and updating can be running on however many machines are available in the system—so the updates, and recovery can occur very fast—the performance gains on the calculations remain over prior art systems.

The adjacency list of elements using (the "using output" of Table 1) a particular element may be split into two components, a "pending" and "completed" list. The pending list stores the target elements using the source element, but that have not yet indicated they have seen (i.e., incorporated) the element at its current revision. This indication may be in a form of a sent message (to the source element or to a managing process that updates a database), or in a form of a managing process that updates a database.

The completed list contains the list of elements which have seen the element at its most recent revision. The expected length of the completed list, or a marker indicating that information about the length of the list is yet unknown, is also stored. This makes answering questions about the state of the graph very easy, when nothing remains in a pending list and no "unknown" markers remain, the graph is in a complete and consistent state.

The status messages used to build the data structure are typically output to a message queue system. The queue may be a specialized message queue system, a database, or some other persistence layer that supports retrieving messages using a query. By queuing the messages, they may be serially, or approximately serially, processed in bulk to reduce the amount of contention maintaining the adjacency list. Updates to individual element's states must be applied in a transactional way. In many cases, for performance reasons, the entire graph state may be represented in a single data structure (solutions for this are addressed below, in the section on Sharding). Therefore, without bulk processing of the status messages, there might be considerable contention updating the adjacency list, limiting the throughput of the status system. Note however, that contention on this structure does not negatively impact performance of the actual calculation operations. In some implementations, the adjacency list may be maintained on dedicated systems capable of holding it entirely in memory or other very high performance storage media and might use a specialized database or key value store to further optimize these operations. In this way the messages may be read from the queue and applied in parallel, which can significantly improve performance.

If a message is received that used an older version of a given element, it may be discarded, as it is out-of-date. If the message used a newer version of an element than previously seen, the elements in that element's "completed" and "pending" list are removed, its using-length is set to the unknown length marker, and its revision information is updated to reflect the latest known revision. This ensures that even if messages arrive out-of-order, updates to the adjacency structure will be correctly applied and the adjacency structure will, eventually, be an accurate representation of the system state.

The original triggering of the updating can occur based on an updater's pressing a "save" button. However, the updater can see the impact of her changes without committing them by the system obtaining a local copy of the existing values. As can be seen in FIG. 3B, an updater who is considering a change to element E1 can obtain local copies of all (or selected) elements that the change will impact (elements E3, E5, and E6). This allows rapid loading, without recalculating the values, of the graph state to be used in, for example, reporting or for additional calculations.

As another optimization, since the impacted elements also require other inputs, local copies of these elements can be obtained as well, so that local copies of elements E2'-E6' are present on the same system as element E1, but this is not required. Once the updater reviews the changes using local copies of elements E2'-E6' and approves them, she can then share her updates with the rest of the world. In addition to the use of local copies of elements E2'-E6', a temporary or alternate server, or "user" specific copies of elements on the shared storage, could be used to provide this staging (or draft) workspace.

The temporary local copies of these "draft" elements may also exist distributed across one or more machines, and in fact, when distributing "draft" elements, only elements with values that differ as the result of a change need to be stored to rapidly present the user with their changes. As an alternative to local copies of the elements, the "difference" between working copies and shared elements maybe stored—much like a common "patch" (or "diff") file. The element difference contains only the information required to reconstruct the local version of the element from the shared version; this has the effect of preserving other users changes to metadata but allowing the value to be updated based on more recent calculations.

In order to ensure that the final impact of updating an element is known to the updater, some mechanism needs to be put in place to ensure all updates throughout the system have been applied. One mechanism is to block the updater from further operations, and only upon allowing further operations to resume can the updater be confident that the updates have been fully applied throughout the system. Another mechanism could be to graphically illustrate to the updater the progress being made as the results of the change propagate throughout the system.

Another mechanism for this is to utilize the revision values in order to reconstruct the various states of the system. In this way, the "current" state of the system is always up to date, and the changes are applied using the calculation process itself, then the historical revisions of the overall system are computed and stored for later retrieval, if and when needed. Then, if a user requests a copy of the graph, or a part of it, the revision numbers may be used to provide a fully consistent version of the graph. To determine when all changes have been fully applied, a global graph state adjacency data structure may be used, as described above.

In one embodiment, the end calculated value can actually be presented to the updater as if it has been changed, when, in fact, it has not yet actually been changed (i.e., the update fully applied). This might be accomplished by "injecting" known changes so that a user making changes and reloading a document will see the expected version (i.e., consistent with their expectation) of that document.

In an application like EDGAR used by the SEC, one needs to guarantee a fully consistent view—so the system must either block new changes and/or block generating the EDGAR data while its recalculating. Or, alternately, EDGAR could be provided with a fully consistent historical view—to prevent it from getting some interim state (and thus, likely, inconsistent state) of the graph. So a user could perform an EDGAR-related operation based on a specific shared revision, or EDGAR could wait for the update to finish, and then the user waits to begin propagating the changes until EDGAR is finished.

Alternately, users could define certain updates as "drafts" and not use such "drafts" to update EDGAR (i.e., take the latest fully consistent shared revision). However, there will still exist points where portions of the graph are inconsistent while applying the drafts to the shared state. A locking mechanism may be implemented to prevent EDGAR generation while a calculation is in progress and to prevent a calculation from initiating when EDGAR generation is in progress. The state of the calculation is easily determined using the graph state adjacency data structure.

Unlike a traditional database, this system and method do not need the entire database or graph to be present to compute a particular portion. Instead only the elements specifically required for a given calculation are required to be made accessible in the database or via some other RPC mechanism.

Furthermore, the system could also provide partial sharing when an updater just wants to share a small portion, a section, a table, or smaller view. The elements associated with the share may come from another document, or can link back into the updater's document. In other systems where the values are computed, then applied to the global state, there may be elements that spider-web out into other documents that cause the system to share all of, or portions of, other documents at the same time. With this distributed calculation and application mechanism, one is only required to share these "extra" items when creating a new element in a different document than the one being shared, then adding a new usage of that element within the document intended to be shared. The other case when additional documents may be required to be shared is when elements are deleted that are used elsewhere, but this is an implementation detail that may be determined by the specific use case—for example some systems may leave the "orphaned" elements in use and others might implement a process to cleanup such cases.

When multiple updates are made, each update has a version and a batch id. This allows the application of updates and calculations to be tracked, and it is possible to answer questions about the state of any one batch of changes. By saving the temporary versions of the elements, as discussed above, to shared persistent storage, a collaborative draft system can be created allowing changes to be safely held in draft for a long period of time and then later shared to the global system.

In other common implementations, the partial-order of the graph is computed, then the elements are evaluated according to that ordering. This will result in the optimal number of calculations, but the initial expense may be quite high. A hybrid design might be utilized in which the first pass is always an asynchronous walk of the graph, then, if the graph is: 1) simple enough or 2) or exhibits pathological features, such as massive "fan outs/fan ins", the partial order can be used that was previously computed (implicitly via the asynchronous walk) to optimize subsequent evaluations. An example of a pathological graph is one where one or more elements have many, many contributors and also impact many, many other elements. In those cases, the algorithm often works very well, but it will result in some over-calculations that can be easily optimized using information about the graph as described above. This has the benefits of allowing previously unknown element systems to be evaluated quickly in many cases, and subsequent alterations to that system to be evaluated much faster.

As described above in the section detailing the graph state adjacency structure, it is possible to determine when an element's direct successors have been completely evaluated based on its latest known value. It is also known when the latest version of a particular element has not yet been seen, since the revision of the elements used in a calculation is also tracked.

This information may be stored on a per-graph basis. A given workbook or document might contain many graphs and a given graph may span many documents or workbooks, however. Updates must be computed and applied to many graphs simultaneously. In order to accomplish this without requiring the loading of a large hash-map, the graphs may be organized into indexed collections. This allows only the collections containing the graph to which a particular element belongs to be loaded. This eases memory constraints in most cases while only slightly complicating the operations required to perform graph merges. This is discussed in detail in the Sharding section below. Based on the adjacency structure representation of a graph's state and the locking system, it is known when a graph is in a fully computed and consistent state.

Determination and Use of Graph States

The following illustrates exemplary mechanisms for the determination of graph states. Such determinations can be utilized to determine completeness or to reconstruct calculations in the event of a system error in which update messages are lost. The following tables illustrate a representation of the graph states in a file. Although shown below as text-based values for ease of illustration, the representation of these values in a file can also be done in any sort of a structured binary form as well.

In the graph states illustrated below, the columns are as follows: Element, Revision, Expected Count, Pending, and Complete, where:
  Element represents the ID of the element;
  Revision is the global (and local, if applicable) revision info of that element;
  Expected count is the number of elements referencing the element;
  Pending List is the list of elements expected to reference this element, but have not yet seen the element at its current revision; and
  Complete List is the list of elements that have seen this element at its current revision.

The table elements may be updated based on Messaging or application of other rules by which table element states can be determined The following use case provides tables illustrating evolving graphs in a system.

TABLE 2

Graph in Infant State

| | | Element | Revision | Expected Count | Pending List | Complete List |
|---|---|---|---|---|---|---|
| STATE | COMPLETE: INCOMPLETE: UNSEEN: | 0 | 2 | 2 | [1, 2] | [ ] |

Table 2 illustrates a graph is in an infant state. Only the root element, Element 0, is fully known to us; although we know about the existence of two other elements, Elements 1 and 2, we have no details about them.

TABLE 3

Graph Starting to Develop

| | Element | Revision | Expected Count | Pending List | Complete List |
|---|---|---|---|---|---|
| COMPLETE: | 6 | 3 | 0 | [ ] | [ ] |
| INCOMPLETE: | 0 | 2 | 2 | [1] | [2] |
| | 2 | 2 | 2 | [5, 4] | [ ] |
| | 3 | 2 | 2 | [7] | [6] |
| UNSEEN: | 1 | 2 | −1 | [ ] | [3, 6] |
| | 4 | 2 | −1 | [ ] | [6] |

Table 3 illustrates a graph that is starting to develop. The root element, Element 0, is known to us, and in a partially completed state. We have also received a message directly from Element 6, which is in a completed state. We have received messages directly from Element 2 and Element 3. Note that we have not yet received a message from Element 1 or Element 4, even though their values were used by Element 6 (indicating out of order messages), so we know of those elements existence. Element 2 is awaiting confirmation that Element 4 and Element 5 have seen its current value, and Element 3 is awaiting an acknowledgment message from Element 7.

TABLE 4

Graph in Nearly Complete State

| | Element | Revision | Expected Count | Pending List | Complete List |
|---|---|---|---|---|---|
| COMPLETE: | 0 | 2 | 2 | [ ] | [2, 1] |
| | 2 | 2 | 2 | [ ] | [5, 4] |
| | 3 | 2 | 2 | [ ] | [6, 7] |
| | 5 | 2 | 0 | [ ] | [ ] |
| | 6 | 3 | 0 | [ ] | [ ] |
| | 7 | 2 | 0 | [ ] | [ ] |
| | 9 | 2 | 0 | [ ] | [ ] |
| INCOMPLETE: | 1 | 2 | 4 | [8] | [3, 4, 6] |
| | 4 | 2 | 2 | [8] | [6] |
| UNSEEN: | 8 | 2 | −1 | [ ] | [9] |

Table 4 illustrates a graph in a nearly complete state. All elements are known, and only a message from Element 8 is required to complete the graph state. We can infer some information about Element 8 based on the message from Element 9, but we do not definitively know if Element 8 has other dependents until receiving the message directly from it.

TABLE 5

Graph in Complete State

|  | Element | Revision | Expected Count | Pending List | Complete List |
|---|---|---|---|---|---|
| COMPLETE: | 0 | 2 | 2 | [ ] | [1, 2] |
|  | 1 | 2 | 4 | [ ] | [8, 3, 4, 6] |
|  | 2 | 2 | 2 | [ ] | [5, 4] |
|  | 3 | 2 | 2 | [ ] | [7, 6] |
|  | 5 | 2 | 0 | [ ] | [ ] |
|  | 6 | 3 | 0 | [ ] | [ ] |
|  | 8 | 2 | 1 | [ ] | [9] |
|  | 9 | 2 | 0 | [ ] | [ ] |
| INCOMPLETE: |  |  |  |  |  |
| UNSEEN: |  |  |  |  |  |

Table 5 illustrates a graph in a complete state. All elements are known, and in a completed state.

Using this scheme, it is also possible to detect error conditions in the data. We can easily detect, and mark, missing elements using a special value for revision. In the following example (see Table 6 Graph with Missing Element), the graph is complete, but Element 6 is missing. We can mark it as complete by passing through the causer's (i.e., the Element that tried sending a message to Element 6, in this case Element 1 and Element 3) information through, and marking Element 6's revision as "0". The special "calculate" messages we send to Element 6 on behalf of Element 1 and Element 3 will result in a normal calc status message being sent back through to the process that maintains the graph state adjacency list. Because we sent one message with Element 1 and one message with Element 3 listed as the causer (as discussed above), Element 6 will be safely moved to both of the causer's completed lists.

TABLE 6

Graph with Missing Element

|  | Element | Revision | Expected Count | Pending List | Complete List |
|---|---|---|---|---|---|
| COMPLETE: | 0 | 2 | 2 | [ ] | [1, 2] |
|  | 1 | 2 | 4 | [ ] | [8, 3, 4, 6] |
|  | 2 | 2 | 2 | [ ] | [5, 4] |
|  | 3 | 2 | 2 | [ ] | [7, 6] |
|  | 5 | 2 | 0 | [ ] | [ ] |
|  | 8 | 2 | 1 | [ ] | [9] |
|  | 9 | 2 | 0 | [ ] | [ ] |
| MISSING: | 6 | 0 | 0 | [ ] | [ ] |

It is also possible to detect error conditions in the data resulting from incomplete or damaged lists on the elements. For example (see Table 7), Element 6's "usings" list is incomplete because Element 9 references it. This can be easily detected because the length of the list, 1, is greater than the expected value, 0. Detecting the opposite case, where an element thinks it is used by something it is not used by, is similarly easy. If an element receives a message from something it is not used by, this condition may be detected, and may then be corrected. This process for detecting this case is similar to that described above. When the calc message arrives with a causer that is not actually used, it may be automatically handled by correcting the data or reporting on the problem.

TABLE 7

Graph with Error

|  | Element | Revision | Expected Count | Pending List | Complete List |
|---|---|---|---|---|---|
| COMPLETE: | 0 | 2 | 2 | [ ] | [1, 2] |
|  | 1 | 2 | 4 | [ ] | [8, 3, 4, 6] |
|  | 2 | 2 | 2 | [ ] | [5, 4] |
|  | 3 | 2 | 2 | [ ] | [7, 6] |
|  | 5 | 2 | 0 | [ ] | [ ] |
|  | 8 | 2 | 1 | [ ] | [9] |
|  | 9 | 2 | 0 | [ ] | [ ] |
| BROKEN: | 6 | 2 | 0 | [ ] | [9] |

Sharding

Clearly the graph state representation can become large in the case of large or complex graphs. The process that maintains the graph state entity may be sharded to accommodate this and allow the graph state maintenance to scale with the system. There are two common incarnations of the sharding process.

In the first, a "naïve dispatcher" process (i.e., one that ignores relationships between elements) may be added that splits the messages into their "identity" (element id, revision info, and usings list) part, and their "used acknowledgement" ([used] element id, [used] element revision info, using element id) part, then routes those messages to a graph maintainer processes responsible for the element referenced in the message. The messages will generally be routed to a shard processor associated with the graph maintainer process based on a hash of the message's element id with no consideration given to the relationships between the elements. Often messages directed to a specific shard processor may be bundled and assigned an id, this allows the dispatcher to maintain a list of message bundle ids sent to a shard processor. Each message type is applied in the way described above. The shard processor can then acknowledge the application of each message bundle to the dispatcher. This allows questions of completeness to be easily and correctly answered in a transactionally safe way by asking the dispatcher if there are unapplied message bundles for any shards. The advantage of this approach is that it is very easy to implement and easily scalable to any number of graphs, and graphs of any size by simply adding additional shards.

In the second form of sharding the work, elements related by a graph are kept within the same shard. This has the advantage that completeness questions may be answered at the individual graph level. There are two common methods of accomplishing this. In the first, a graph id is assigned to each element, then maintained as graphs are merged and split (for example, by altering a formula), and the messages are then routed to specific shards, perhaps based on a hash of the graph id and possibly by an independent "dispatcher" process. The messages are then applied as described above. This method is easy to implement and works well if graph merges and splits are infrequent and graph sizes modest. The second method is more flexible, but more complicated to implement. In this method an index or list of elements, or graphs, contained within any given shard may be maintained allowing messages to be routed appropriately. The index might be implemented using a traditional method, for example a tree or hash-map, or using probabilistic structures such as bloom filters. Depending on the implementation, a graph id may be assigned to elements, as described above, or the indexes may simply map individual elements to shards. When graphs are merged or split, indexes may be regenerated and/or markers left in the previous shard to "redirect" messages for the no-longer-present elements. The advantage of this method is that graphs may be rearranged within shards to optimize the system, for example, to balance work, to place large graphs in dedicated shards, to give heavily used graphs higher (or lower) priority, or to "archive" older or less commonly used graphs.

All of these approaches described above may be combined to optimize the system, and to allow graphs of massive size to be efficiently handled. For example, extremely large graphs might be assigned a special id that routes messages related to that graph to a "dedicated" naïve dispatcher process, as described above. While smaller graphs might be assigned across a set of "regular" graph state maintainers. These mechanisms may be combined and composed in many ways to create systems tailored to the specific requirements of the application. Message dispatchers may be implemented as standalone processes or within the other processes.

In all cases, sharded and not, the graph state maintainer processes may be dedicated systems or may be run on the same systems as the calculation process itself. The dispatchers and message processors can consume messages from the queue and either split and route them, in the case of a dispatcher, or apply them, in the case of a processor. Generally it is preferable for the graph state message processors to run roughly in serial to avoid contention issues. The same is true of the message dispatcher, since it will maintain a list of message bundles dispatched to each shard message processor. When the message processors process a bundle, they send a message to the dispatcher notifying it that that bundle has been applied. This allows completeness questions to always be answered. However, it also means there can be a lot of writes to those lists, due to the adding and removing. Depending on the implementation, it may be possible to run many dispatchers and processors in parallel, however. The graph state adjacency lists may be kept within specialized databases or key-value stores that offer special "atomic" pipeline or set operations. When systems offering similar features are available, so that contention is not an issue, many message processors may be run at once.

Certification/Approval Process

A further aspect that may be incorporated into the recalculations is the notion of an approval process and certification. Under the Sarbanes-Oxley Act of 2002, CEOs and CFOs of publicly traded companies are required to certify the appropriateness of their financial statements and disclosures. However, it is impossible for such high level individuals to fully understand each and every component of financial data that key reports, such as a company's annual report, are based upon. These individuals thus rely in part on their subordinates that each of their respective inputs are accurate. This reliance goes down through the corporate financial structure. Also because of this, while subordinates are providing data, they may wish to approve those numbers before they are used in later calculations.

In many instances, the CEO and CFO are unwilling to certify a particular report, statement, or financial result unless subordinates who are responsible for an underlying component are willing to certify the component as well. In a hierarchical manner, the subordinates may have further subordinates responsible for an even further underlying component. At each level, these certifications may serve as an approval of the number for use by other formulas as well. As a result, an end certification may actually be the result of many other certifications performed in a hierarchical manner. The approval process can be viewed at a more technical level, according to an embodiment, as certifying a trigger for calculations.

Figure 5:
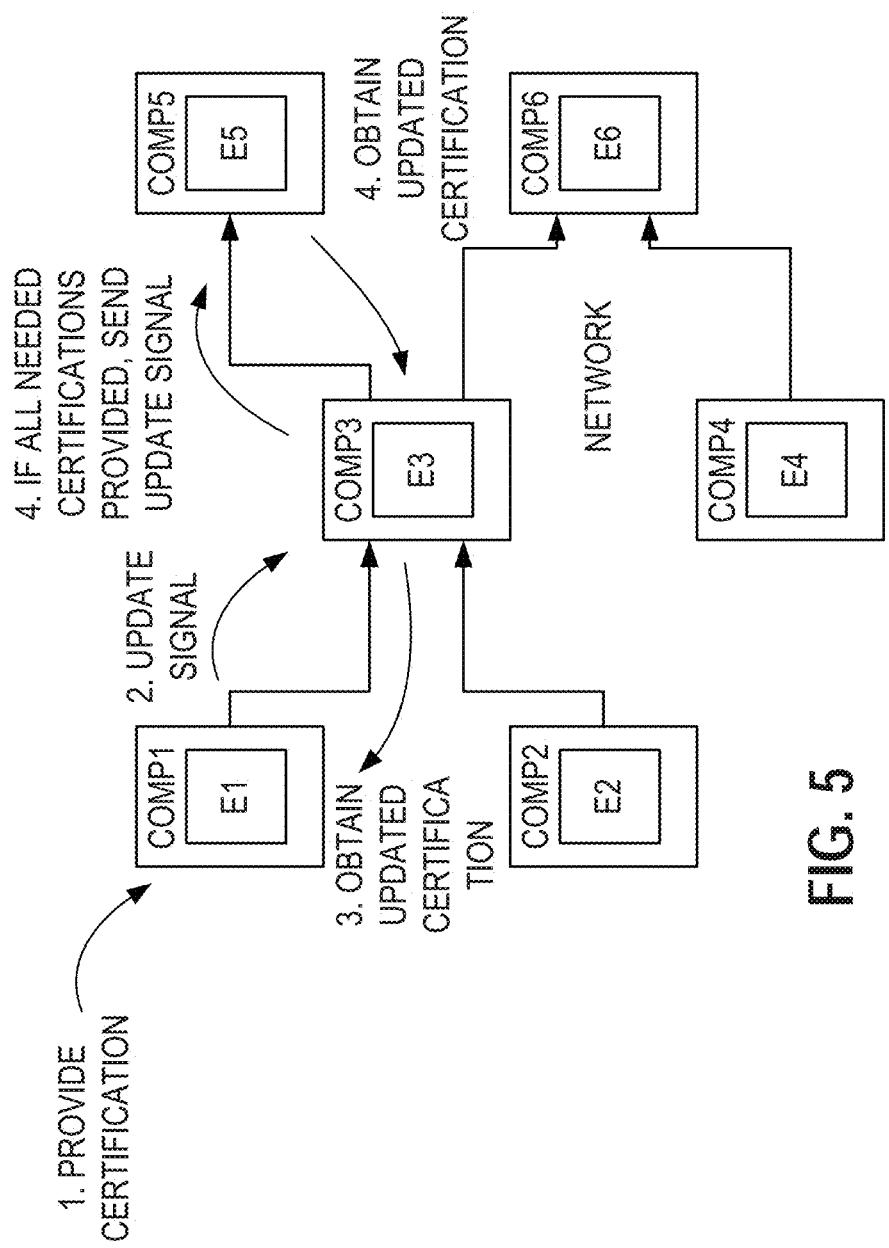
FIG. 5 is a block diagram illustrating a certification process.

FIG. 5 is a block diagram similar to FIG. 3A, but including certification elements. In this figure, element E1 requires a manual certification by employee A that the data entered for element E1 is accurate. Such a manual entry could be performed by any known form of a manual or digital signature, and known mechanisms could be utilized to ensure that any such signature or certification is authentic. The proper entities who must certify a particular element are specified in advance, in a manner similar to how calculations and relationships between elements are defined in advance. An element could require no certification, one certification, or multiple certifications in order to be fully certified. Likewise, an element's value may require approvals that are specified in a way similar to that described above before their value may be used in other formulas or reports. Relevant dates, the original source of the number, and other information associated with the certification or approval could be included.

The certification of an element could initiate a lock on the element that prevents further changes to that element. Alternately, a change in the value of an element could result in a removal of the certification of that element, meaning that it must be recertified. It is possible to have a warning message provided to a user or the system when an attempt is made to change a value that has already been certified.

Once a subordinate has entered all values into a document, workbook, or form, their manager might be required to approve those values for usage in other parts of the system. If updates to the numbers are made, then before the calculate signals are sent to other elements, the updated values might need to be re-approved. Once re-approved calculate signals could be sent to the elements using that value. Alternatively, an update to the values may not be allowed to be shared to the global state until the approval is made, and once approved the values may then be applied as described above.

Once the element E1 has been fully certified, a flag, or other form of marker could be changed in E1, thereby designating that element as a "fully certified" or "approved" element, and an update signal is sent to other elements that may use it as an input. In FIG. 5, upon being fully certified, an update signal is sent to element E3. It is possible that the update signal is a general one that is the same as is sent if a value is changed. In the alternative, the update signal might simply be a special one that simply indicates the value is now fully certified. If the underlying value itself is unchanged, then there may not necessarily be a need to completely perform all underlying recalculations. In other words, the certification could be operated independently of the calculations themselves. In this regard, a certification signal (with a relevant element identifier) itself might be sufficient without requiring a further obtaining of the updated underlying certification information.

Element E3 then obtains the updated certification regarding element E1. In one example, element E3 only needs certification from element E1 in order to be certified itself. If it has all needed certifications (here certification of element E1), it subsequently sends an update signal to element E5, which triggers element E5 to obtain the updated certification information from element E3.

Any element could require certification or approval from any number of underlying/related elements before being certified itself, and could also require an independent certification or approval itself. For example, element E3 may only require certification of element E1 in order for it to be certified. In this case, the certification of element E3 could take place automatically, once it obtains the certification information from element E1. In another example, element E3 requires certification from both elements E1 and E2, and only upon certification of both is element E3 certified. Any mathematical rules or criteria could be applied in the certification (mathematical ANDs, ORs, or other logical operators, values less than, greater than, equal to, negative, user defined formulas, such as ratios, etc.).

In a further example, element E3 not only needs the certifications of underlying elements E1 and E2, but further requires a manual certification of E3 itself. In this case, not only would the underlying elements of E1 and E2 need to be certified, but a signature of a person would be required before element E3 could be considered fully certified. In order to facilitate the certification process, reports could be generated that list outstanding certifications needed for any particular element (and collectively, for multiple elements). Furthermore, for a report, etc. for which all necessary certification have been obtained, a report could be generated showing the full certification hierarchy.

In this way, certifications for complex reports can be easily tracked and managed, thereby eliminating traditional inefficiencies with the certification process.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. Software modules may be used to implement various components described above. When software modules are involved, these software modules may be stored as program instructions or computer readable codes executable on the processor on a non-volatile computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

Embodiments of the invention may be described in terms of functional block components and various processing steps. Such functional blocks may be realized by any number of hardware and/or software components that perform the specified functions. For example, the embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, embodiments of the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, embodiments of the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. The term "number" can refer, where appropriate, to any form of a unique identifier.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

What is claimed is:

1. A method for performing calculations in a distributed networked environment, comprising:

receiving, via a message queuing system, a first calculate update signal which is a first message generated in response to an update of a first source element, wherein the first message is specifically directed to a target calculated element to be updated on a target element computer and includes version information for the first source element;

receiving, via the message queuing system, a second calculate update signal which is a second message generated in response to an update of a second source element, wherein the second message is specifically directed to the target calculated element and contains version information for the second source element, wherein calculation of the target calculated element depends on the first source element and on the second source element;

determining, based at least in part on the version information for the first source element and the version information for the second source element, whether the second message is redundant to the first message;

discarding the second message from the message queuing system if the second message is determined to be redundant to the first message;

in response to the first message, obtaining, by a processor on the target element computer, the updated first source element and the updated second source element; and performing a calculation to update the target calculated element using the obtained updated first source element and updated second source element.

2. The method of claim 1, further comprising:

receiving, via the message queuing system, at least one additional calculate update signal in the form of an additional message generated in response to an additional update of an additional source element upon which the target calculated element depends, wherein the additional message includes an element identifier of the additional source element;

determining that the at least one additional message is redundant by matching the element identifier of the additional message with an element identifier for a different update message in the messaging queuing system.

3. A method for performing calculations in a distributed networked environment, comprising:

receiving an update of a draft copy of a source element, wherein the draft copy of the source element is specific to a user of a plurality of users;

obtaining a draft copy of a target calculated element, wherein
the target calculated element depends on the source element in a calculation,
the target calculated element is shared among the plurality of users,
the draft copy of the target calculated element is specific to the user;

performing a calculation to update the draft copy of the target calculated element without updating the target calculated element;

in response to the user sharing the update of the draft copy of the source element with the plurality of users, updating the source element in accordance with the updated draft copy of the source element;

sending a calculate update signal which is a message communicated through a message queuing system in response to the updating, specifically directed to the target calculated element, wherein the target calculated element is calculated for updating on a target element computer, and the target element computer may be the first computer or a second computer connected to the first computer;

obtaining the updated source element by a processor on the target element computer associated with the target calculated element in response to the sending; and performing a calculation to update the target calculated element using the obtained updated source element.

4. The method of claim 3, further comprising:

utilizing the updated target calculated element in a subsequent calculation.

5. The method of claim 1, further comprising:

presenting viewable results of performing the calculation prior to the user sharing the update.

6. The method of claim 3, further comprising:

obtaining draft copies of a plurality of target calculated elements that may be impacted by a change in the source element.

7. The method of claim 3, further comprising:

distributing the updated target calculated element across a plurality of computers.

* * * * *